Patented Nov. 5, 1929

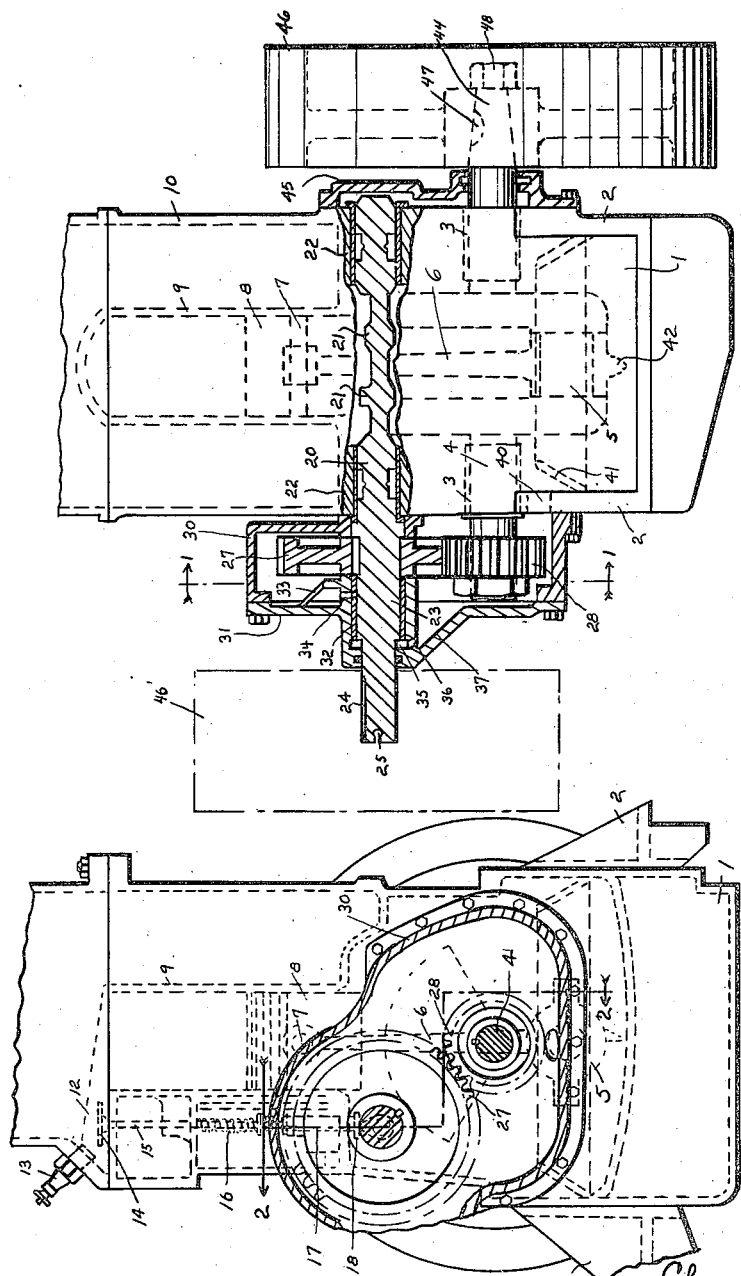

1,734,181

UNITED STATES PATENT OFFICE

CHARLES W. PENDOCK, OF MILWAUKEE, WISCONSIN, ASSIGNOR TO LE ROI COMPANY, OF WEST ALLIS, WISCONSIN

INTERNAL-COMBUSTION ENGINE

Application filed May 14, 1923. Serial No. 638,746.

This invention relates to improvements in internal combustion engines and, more particularly, to the power transmitting mechanism of such engines.

It is well known that internal combustion engines do not run efficiently at low speeds and although it is possible, by proper design, to control within limits the speeds at which a given engine will operate efficiently, it is nevertheless a fact that for many purposes the range of speeds through which such engines can be made to operate has been far too limited and it has been necessary to use reduction gearing.

Internal combustion engines of relatively small size and low power may be used with great effectiveness for driving comparatively heavy machinery at slow speeds. Concrete mixers and other like machinery driven at relatively slow speeds would impose heavy, if not impossible, burdens upon a small engine if the engine were coupled directly to the mixers. If, however, a 2:1 reduction gearing is employed to connect the gearing with the mixer, the motor is allowed to run at speeds enabling it to operate efficiently and the torque transmitted to the mixer is double that which would be obtained if the engine were coupled directly thereto. The above statement is intended merely to be general and has obviously left out of consideration such minor losses as friction losses in the reduction gearing.

It frequently happens that a manufacturer of internal combustion engines supplies such engines to various manufacturers of special machinery. In many instances, the work for which the engine is desired is such that it may be directly coupled to the machinery which it is to drive. In other instances, such as that above mentioned, it is desirable to couple the driven machinery to the engine through reduction gearing. In these latter instances, probably the most usual ratio in the reduction gearing is the ratio of 2:1. At any rate, it will be evident that an engine designed to render its power available either in direct ratio or in the ratio of 2:1 will have a far wider variety of uses than would an engine without this feature.

It is recognized that an engine may be provided with reduction gearing having any desired ratio and that the engine may be thereby adapted to the requirements of the purchaser. It must also be recognized, however, that the standardization of engine parts greatly promotes manufacturing efficiency, and if the engine manufacturer is required to maintain a stock of gear reduction appliances for his motors so that such appliances may be fitted to the motors from time to time as the needs of the customer require, the standardization of the work of such a manufacturer is seriously interfered with.

It so happens that in substantially every four-cycle internal combustion engine the cam shaft driven at one-half the speed of the crank shaft is an essential element. The cam shaft, as it has heretofore been constructed, has been a comparatively light shaft provided with bearings just sufficient to enable it to perform the work for which it is designed. In certain engines, power has also been taken from the cam shaft for the actuation of various instrumentalities incidental to engine operation. For example, power derived from the cam shaft has frequently been used to drive a water circulating pump, a cooling fan, a magneto, or an electric generator. In no instance, however, so far as I am aware has the full torque of an internal combustion engine ever been transmitted through its cam shaft.

This invention contemplates a radical departure from ordinary practice in that it is proposed to make the cam shaft, or an extension thereof, available for the transmission of full engine power.

Broadly stated, it is the primary object of this invention to eliminate all necessity for using a transmission train exteriorly of an engine to produce gear reductions similar to those which already exist as an essential feature of the engine itself. I desire to provide a four cycle internal combustion engine, for example, which will be designed to transmit its full power through the timing gearing and through the cam shaft or a member driven therewith at lower speeds and greater torques than those of the crank shaft.

Furthermore, it is my object to simplify the manufacturer's problem and to produce a standardized product without the need of extraneous gearing by rendering available for full power transmission both the main shaft of an engine and an auxiliary shaft essentially operable at a different rate of speed to perform some function necessary to engine operation.

It is also an object of this invention to provide a special cam shaft, bearings and timing gearing capable of withstanding the increased stresses which these parts are called upon to bear when the entire torque of the motor is transmitted through the cam shaft. It is also my object to provide an engine having simple, compact and easily constructed means for enclosing the ends of shafts not needed for the transmission of power and for providing a suitable and well lubricated bearing at the outer or power transmitting end of the cam shaft.

My invention is illustrated more particularly in the accompanying drawings which illustrate a four-cycle internal combustion engine from which parts not essential to an understanding of this invention have been omitted in order not to complicate the showing herein.

In the drawings:

Figure 1 is an end elevation of an engine embodying this invention, the housing for the timing gearing being cut away to a section indicated by line 1—1 of Figure 2.

Figure 2 is a side elevation of the same engine as viewed from the right in Figure 1, the housing for the timing gearing being cut away on the section indicated at 2—2 in Figure 1, and portions of the engine crank case being broken away to expose the full length of the cam shaft.

Like parts are identified by the same reference characters throughout the several views.

The engine herein shown is a standard four-cycle internal combustion engine except for certain features hereinafter to be noted. It will be understood that while the engine here shown is a one cylinder engine, this invention is applicable in like manner to four-cycle internal combustion engines having any other number of cylinders. This invention is also applicable to six-cycle internal combustion engines and other engines in which the cam shaft operates at speeds other than the normal rate of one-half of the crank shaft speed. The principle of operation of this invention and the manner of its application to all multi-cycle engines is fully exemplified by the herein-disclosed application of the invention to a one cylinder engine.

The crank case of this engine is indicated at 1 and may be provided with hangers 2 by means of which the engine may be suspended from a suitable frame. The crank case is provided with suitable bearings at 3 for a crank shaft 4 upon the crank portion 5 of which a connecting rod 6 is suitably journaled in the usual manner. A wrist pin 7 is used to secure the upper end of the connecting rod 6 within a piston 8 reciprocable in a cylinder 9. The water jacket 10 which surrounds cylinder 9 may be cast integrally therewith and with the crank case 1.

It is not essential to this invention what type of head is provided for the cylinder 9. The accompanying drawing illustrates a motor of the L-head type having certain unusual features separately claimed in a companion application wherein 12 represents the recess into which the spark plug 13 projects and into which the valves 14 open. The valve stems 15 are suitably guided and provided with compression springs 16 in the usual manner. The valve tappets 17 are headed as at 18 to provide cam followers through which the valves may be actuated in a suitably timed relation to the piston movements.

Offset from the crank shaft 4 and preferably parallel therewith to conform to ordinary motor practice is the cam shaft 20 which carries cams 21 to a number corresponding to the number of valves to be actuated. The motor herein disclosed being but a single cylinder motor, only two cams 21 are shown. These cams are intended to operate the intake and exhaust valves 14. The cam shaft is here illustrated as being above and to the left of the crank shaft as viewed in Fig. 1. This specific position of the cam shaft is not of the essence of this invention for it is contemplated that this invention may be put into practice to transmit the full power of the motor through the cam shaft wherever that shaft may be located. As is well known in the art, the position of the cam shaft varies widely in different engines and it is only essential that the design of the engine be such that where the full torque of the engine is to be transmitted therethrough, adequate bearings can be provided. The cam shaft bearings 22 are provided at the front and rear of the crank case and are preferably made more substantial than is the ordinary practice.

That portion of cam shaft 20 which carries cams 21 may conveniently be made of the ordinary diameter since, in the practice of this invention, it is subjected to no unusual strains. That portion of shaft 20, however, which lies outside of the rear bearing 22 or to the left as viewed in Fig. 2 will be noted to be of comparatively great diameter, the increased size being intended to indicate a comparatively great strength. This exterior portion of the shaft, designated in its entirety by the numeral 23, is preferably far stronger than the corresponding part in an ordinary engine, in order that it may withstand the stresses imposed upon it when it is carrying the entire engine torque. The extremity of the portion 23 of cam shaft 20 is provided at 24 with an axial slot and at 25 with a transversely disposed recess whereby it is adapted to receive power transmitting connections enabling it to be coupled to a suitable driven shaft. Contrary to ordinary practice, the extremity of the cam shaft portion 23 is exposed in order that couplings may quickly be effected.

The usual timing gearing is provided, with the exception that it is sufficiently increased in strength to serve the dual purpose for which it is called upon in the practice of my invention. In an engine of the type herein disclosed, the gear 27 upon the cam shaft bears 2:1 ratio to the pinion 28 which is keyed to the crank shaft. As a consequence, the cam shaft will revolve at the desired rate of one-half crank shaft speed to complete a cycle of valve movements once in each two revolutions of the crank shaft.

The pinion 28 and gear 27 are enclosed by a housing designated in its entirety by the reference character 30. This housing is unusual, however, in the fact that its closure plate 31 carries a very substantial bearing 32 for the projecting portion 23 of cam shaft 20. This bearing may conveniently be extended into contact with gear 27 and may be designed to absorb what little end thrust is present in a shaft of this kind. The bearing may conveniently be lubricated from a trough 33 which is adapted to collect lubricant thrown by gear 27 into the top of housing 30. Trough 33 communicates through a passage 34 with the interior of the bearing. A recess 35 at the end of the bearing is adapted to collect surplus lubricant and prevent it from exuding from the housing along the projecting portion of the cam shaft. A felt washer may be inserted in this recess if desired. Recess 35 is drained through an opening 36 and down the inclined wall 37 which supports the bearing back into the interior of housing 30. The housing is in communication through an opening 40 with the interior of crank case 1. A flange 41 within the crank case may be utilized to collect lubricant which is splashed about within the crank case by the oil throwing device 42 carried by the connecting rod bearing. By means of flange 41, the lubricant is maintained at a constant level within housing 30, any surplus of lubricant being drained back to the bottom of the crank case by overflowing the flange 41. It will be noted that the upper margin of said flange is at a height such that the pinion 28 will run constantly in the lubricant and will transfer a portion thereof to the gear 27 by which the oil is thrown to the top of the housing as aforesaid.

While it is not essential to this invention that the particular lubricating means above discussed shall be used to lubricate the bearing 32, it is nevertheless of obvious importance to provide some adequate means for supplying oil to that bearing since it carries a large share of the added stress imposed upon the cam shaft in the practice of this invention.

It will be noted that, contrary to the usual practice, the rear end of the crank shaft 4 is wholly enclosed by the cover plate 31 of housing 30. The front end 44 of the crank shaft preferably projects, however, through the forward housing 45 and carries the usual fly wheel 46 which may be fastened thereto by a key 47 and a nut 48. When it is desired to take power directly from the crank shaft, the fly wheel 46 may be used as a pulley or any other ordinary means may be utilized to couple the projecting end of the crank shaft directly with a shaft to be driven. For example, the nut 48 may be unscrewed and may be utilized to secure a power transmitting connection to the crank shaft. The entire fly wheel 46 may even be removed, if desired, and this wheel or another fly wheel 46' may be mounted upon the projecting end of the cam shaft as indicated by broken lines in Fig. 2. If, on the other hand, it is desired to take power from the cam shaft, which rotates at one-half crank shaft speeds and with twice the torque, the shaft to be driven may be coupled directly to the free, projecting end of the heavy portion 23 of the cam shaft, the keyway 24 being used for this purpose if desired.

It will be evident to those skilled in the art that a four-cycle internal combustion engine has been provided from which the power can be taken through the crank shaft at normal engine speeds and torques or through the projecting end of the strengthened cam shaft at one-half normal crank shaft speeds and double normal crank shaft torque. An engine so constructed has a wide range of adaptability and can be put by the purchaser to widely varying uses without requiring the association with it of extraneous reducing gearing.

It is particularly to be noted and the fact is, therefore, repeated that the ordinary multiple cycle internal combustion engine is necessarily equipped with self-contained timing gearing, which usually, although not necessarily, involves a reduction in the ratio of 1:2. It is regarded as the essence of this invention that the self-contained reduction gearing of any otherwise ordinary engine shall be available to transmit the entire torque developed by the engine.

It is further desired to emphasize the fact that while the discussion herein has been limited principally to an embodiment of this invention wherein the timing gearing and cam shaft have been utilized to transmit full engine power, it is not desired to limit the invention to this particular structure. It is contemplated that in addition to the possibility of using the cam shaft for this new function, it shall also be recognized that other secondary shafts and other gearing self-contained in the engine for driving such shafts may likewise be adapted to transmit full engine power.

I claim:

1. An internal combustion engine including a crank shaft, a crank case provided with journals for the crank shaft, a cam shaft having a portion adequate for the transmission of full engine power, a housing enclosing said cam shaft portion and provided with adequate bearings therefor, said housing being in communication with the interior of said crank case, an oil collecting channel above one of said bearings and provided with a passage leading thereto, intermeshing gearing upon the crank shaft and the cam shaft within said housing, and means for maintaining a constant level of oil in said housing, the level being such that one of said gears will dip therein whereby said gearing and said bearing are lubricated.

2. An internal combustion engine including a crank shaft, a crank case provided with bearings for said shaft and adapted to retain a lubricant for said engine, a secondary shaft essential to engine operation, and speed changing motion transmitting connections between said crank shaft and said secondary shaft adapted to transmit full engine power and arranged for lubrication from the lubricant within said crank case, a portion of said secondary shaft being available from the exterior of said engine for power transmitting purposes, the part of said secondary shaft including said portion and receiving said power transmitting connections being adequate to transmit full engine power.

3. An internal combustion engine including a crank case ported upon one end, a crank shaft journaled in said crank case and projecting at both ends therefrom, a cam shaft rotatably supported from said crank case and having an end projecting therefrom, the projecting end being adequate to transmit full engine power, reduction gearing connecting a projecting end of the crank shaft with said projecting end of the cam shaft and adapted to transmit full engine power, a housing for said gearing provided with an exterior bearing for said cam shaft and in communication through said port with said crank case, an oil collecting channel within said housing leading to said bearing, and means for returning to said housing lubricant working outwardly along the projecting end of said cam shaft.

4. In a device of the character described, the combination with the crank case of an internal combustion engine, of a crank shaft journaled therein and projecting at both ends therefrom, a supplemental shaft including a relatively heavy portion and a relatively lighter portion provided with cams, the relatively heavier portion of said cam shaft projecting beyond said crank case upon one side thereof, suitable bearings for said supplemental shaft at the end of the lighter portion thereof, intermediate the lighter and heavier portion and intermediate the ends of the heavier portion, whereby the extremity of such heavier portion projects from its bearings and is freely available for power transmission, and gearing mounted upon said crank shaft and upon said cam shaft intermediate the bearings of the heavier portion thereof, said gearing being adequate for the transmission of full engine power.

5. In a device of the character described, the combination with the crank case of an internal combustion engine, of a crank shaft journaled therein and projecting at both ends therefrom, a supplemental shaft including a relatively heavy portion and a relatively lighter portion provided with cams, the relatively heavier portion of said cam shaft projecting beyond said crank case upon one side thereof, suitable bearings for said supplemental shaft at the end of the lighter portion thereof, intermediate the lighter and heavier portion and intermediate the ends of the heavier portion, whereby the extremity of such heavier portion projects from its bearings and is freely available for power transmission, gearing mounted upon said crank shaft and upon said cam shaft intermediate the bearings of the heavier portion thereof, said gearing being adequate for the transmission of full engine power, and a supplemental casing enclosing said gearing and one end of said crank shaft, whereby one end of said crank shaft and an opposite end of said supplemental shaft are exposed for transmission purposes, the other ends of the respective shafts being enclosed.

6. In a device of the character described, the combination with the crank case of an internal combustion engine, of a crank shaft journaled therein and projecting at both ends therefrom, a supplemental shaft including a relatively heavy portion and a relatively lighter portion provided with cams, the relatively heavier portion of said cam shaft projecting beyond said crank case upon one side thereof, suitable bearings for said supplemental shaft at the end of the lighter portion thereof, intermediate the lighter and heavier portion and intermediate the ends of the heavier portion, whereby the extremity of such heavier portion projects from its bearings and is freely available for power transmission, gearing mounted upon said crank shaft and upon said cam shaft intermediate the bearings of the heavier portion thereof, said gearing being adequate for the transmission of full engine power, and a supplemental casing enclosing said gearing and one end of said crank shaft, whereby one end of said crank shaft and an opposite end of said supplemental shaft are exposed for transmission purposes, the other ends of the respective shafts being enclosed, together with means for supplying lubricant from said crank case to said supplemental casing for the lubrication of gears therein.

7. In a device of the character described, the combination with the body portion of an internal combustion engine provided with cam shaft and crank shaft bearings, of a crank shaft journaled in its bearings in said body portion and projecting at both ends therefrom, a cam shaft journaled in its bearings in said body portion and having an extension of relatively increased strength projecting at one end from said body portion, the other end of said cam shaft being enclosed, a supplemental casing connected with said body portion and including a relatively heavy bearing for the said cam shaft extension, said casing enclosing one of the projecting ends of said crank shaft, and gearing disposed within said casing and including gears mounted respectively upon the enclosed end of the crank shaft and upon the said cam shaft extension intermediate one of said cam shaft bearings and the relatively heavy bearing in said supplemental casing, the end of said cam shaft extension being exposed beyond said casing and available for power transmission purposes and the opposite end of said crank shaft being likewise exposed and available for power transmission purposes.

8. In a device of the character described, the combination with the relatively stationary portions of an internal combustion engine, such portions being provided with crank and cam shaft bearings, of a crank shaft journaled in said bearings and projecting at one side of said portion, a cam shaft having a relatively light-weight portion provided with cams and a relatively heavier extension provided with an intermediate bearing and with a bearing adjacent one end thereof, a gear upon said extension between said last mentioned bearings, a gear upon said crank shaft meshing with the gear upon said extension, means enclosing the end of said crank shaft bearing, said gear and means enclosing the opposite end of said cam shaft, said shafts each having portions projecting beyond the relatively fixed portions of said engine and each being adapted to receive detachably a fly wheel, whereby to be adapted either for power transmission or for supporting a fly wheel of a diameter greater than the distance between said shafts.

9. In a device of the character described, the combination with the crank case of an internal combustion engine and a crank shaft journalled therein, of supplemental shafting including a cam shaft portion provided with cams and a relatively very heavy power delivery portion of greater diameter than said cam shaft portion comprising an extension thereof and adapted to transmit full engine power at the torque developed at cam shaft speeds, reduction gearing of a ratio suitable for cam shaft actuation connecting said crank shaft with said power transmitting extension portion of the supplemental shafting and adapted for the delivery of full engine power thereto, and suitable bearings for said supplemental shafting including bearing means for the power delivery portion thereof adequate to support said portion in delivery of full engine power, said portion being accessible outside of said crank case for full power transmission at cam shaft speeds and said crank shaft having a portion simultaneously and alternatively available for delivery of full engine power.

10. In a device of the character decribed, the combination with the crank case of an internal combustion engine, of a crank shaft journalled therein, a supplemental shaft including a relatively heavy portion and a relatively lighter portion provided with engine valve cams, suitable bearings for said supplemental shaft at the lighter portion thereof and intermediate the ends of the heavier portion, an extremity of said heavier portion projecting from said bearings outside of said crank case and freely available for power transmission, and cam operating reduction gearing mounted on said crank shaft and on said cam shaft at the heavier portion thereof, said gearing and heavier cam shaft portion being adequate for the transmission of full engine power at speeds proper for the operation of said cams.

11. In a device of the character described, the combination with the crank case of an internal combustion engine and a crank shaft journalled therein and projecting at both ends therefrom, of a supplemental shaft including a relatively heavy portion and a relatively lighter portion provided with engine valve cams, suitable bearings for said supplemental shaft at the end of the lighter portion thereof and intermediate the ends of the heavier portion, gearing of a ratio required for operation of said cams mounted upon said crank shaft and upon said heavier supplemental shaft portion and adequate for the transmission of full engine power, and a supplemental casing enclosing said gearing, the heavier portion of said supplemental shaft projecting beyond said crank case and from the bearing intermediate its ends whereby the projecting end of said supplemental shaft and an opposite end of said crank shaft are freely accessible for transmission purposes at the relative ratio of the respective shafts as determined by said gearing.

12. In a device of the character described, the combination with the crank case of an internal combustion engine and a crank shaft journalled therein and projecting at both ends therefrom, of a supplemental shaft including a relatively heavy portion and a relatively lighter portion provided with engine valve cams, suitable bearings for said supplemental shaft at the end of the lighter portion thereof and intermediate the ends of the heavier portion, gearing of a ratio required for operation of said cams mounted upon said crank shaft and upon said heavier supplemental shaft portion and adequate for the transmission of full engine power, and a supplemental casing enclosing said gearing, the heavier portion of said supplemental shaft projecting beyond said crank case and from the bearing intermediate its ends whereby the projecting end of said supplemental shaft and an opposite end of said crank shaft are freely accessible for transmission purposes at the relative ratio of the respective shafts as determined by said gearing, together with a common source of lubricant for said crank shaft, gearing, and supplemental shaft; and means for supplying lubricant from said source to the gearing and the respective shafts.

13. In a device of the character described, the combination with the relatively stationary casing of an internal combustion engine, such casing having crank and cam shaft bearings, of a crank shaft journalled in said bearings and projecting at one side of the casing, a cam shaft journalled in said bearings and having a relatively light weight portion provided with cams and a relatively heavier portion projecting from the casing at the side thereof opposite to that at which the crank shaft projects, cam operating and power transmitting reduction gears respectively disposed upon the crank shaft and upon said heavier cam shaft portion between said bearings, beyond one of which said portion projects; said oppositely projecting portions of said shafts each being adapted to receive detachably a fly wheel of a radius greater than the distance between said shafts, whereby to be adapted either for power transmission or for supporting such a fly wheel.

CHARLES W. PENDOCK.